US007144154B2

(12) United States Patent
Yates et al.

(10) Patent No.: US 7,144,154 B2
(45) Date of Patent: Dec. 5, 2006

(54) SYSTEM AND METHOD OF MEASURING AND CONTROLLING TEMPERATURE OF OPTICAL FIBER TIP IN A LASER SYSTEM

(75) Inventors: David C. Yates, West Chester, OH (US); William A. Pollack, South Lebanon, OH (US); Robert M. Trusty, Cincinnati, OH (US); Scott Allen Nield, Reading, OH (US)

(73) Assignee: Ethicon Endo-Surgery, Inc., Cincinatti, OH (US)

( * ) Notice: Subject to any disclaimer, the term of this patent is extended or adjusted under 35 U.S.C. 154(b) by 0 days.

(21) Appl. No.: 10/650,535

(22) Filed: Aug. 28, 2003

(65) Prior Publication Data
US 2004/0073133 A1    Apr. 15, 2004

Related U.S. Application Data

(62) Division of application No. 09/906,535, filed on Jul. 16, 2001, now Pat. No. 6,796,710.

(60) Provisional application No. 60/296,783, filed on Jun. 8, 2001.

(51) Int. Cl.
*G01K 11/00* (2006.01)
*G01J 5/00* (2006.01)
*H01S 3/13* (2006.01)

(52) U.S. Cl. ............ 374/161; 374/131; 372/38.01; 372/38.07; 372/29.02

(58) Field of Classification Search ............ 606/10, 606/11, 12, 15, 16; 374/161; 372/38.01, 372/38.02, 38.07, 29.02, 29.021, 32
See application file for complete search history.

(56) References Cited

U.S. PATENT DOCUMENTS 4,374,328 A    2/1983    Tekippe et al.
(Continued)

FOREIGN PATENT DOCUMENTS

EP    1 088 523 A1    4/2001
(Continued)

OTHER PUBLICATIONS

Smith et al., "Principles And Practice Of Automatic Process Control", 1997, John Wiley & Sons, 2nd edition, pp. 1-9, 197, 222, 223, 225-227, 231-234.*
(Continued)

*Primary Examiner*—Diego Gutierrez
*Assistant Examiner*—Mirellys Jagan

(57) ABSTRACT

A system and method of sensing temperature at an optical fiber tip, including the steps of positioning a slug of fluorescent material adjacent the optical fiber tip, providing an optical stimulus having a wavelength within a first predetermined range through at least one fiber optically linked to the optical fiber tip, wherein a desired optical fluorescent response having a wavelength within a second predetermined range from the fluorescent slug is generated, detecting a signal representative of the optical stimulus, detecting a signal representative of the optical fluorescent response, digitally processing the optical stimulus signal and the optical fluorescent response signal to determine a phase difference therebetween, and calculating a temperature for the optical fiber tip as a function of the phase difference. The phase difference between the optical stimulus signal and the optical fluorescent response signal may be determined directly or indirectly as a function of the phase difference between a reference signal and the optical stimulus signal and the phase difference between the reference signal and the optical fluorescent response signal.

12 Claims, 10 Drawing Sheets

U.S. PATENT DOCUMENTS

| | | | |
|---|---|---|---|
| 4,437,772 A | 3/1984 | Samulski | |
| RE31,832 E | 2/1985 | Samulski | |
| 4,583,539 A | 4/1986 | Karlin et al. | |
| 4,621,929 A | 11/1986 | Phillips | |
| 4,652,143 A | 3/1987 | Wickersheim et al. | |
| 4,663,520 A | 5/1987 | Tanaka et al. | |
| 4,675,529 A | 6/1987 | Kushida | |
| 4,695,697 A * | 9/1987 | Kosa | 606/12 |
| 4,700,064 A | 10/1987 | Fujita | |
| 4,703,175 A | 10/1987 | Salour et al. | |
| 4,799,767 A | 1/1989 | Woodruff | |
| 4,845,647 A * | 7/1989 | Dils et al. | 374/131 |
| 4,864,098 A | 9/1989 | Basanese et al. | |
| 4,895,156 A * | 1/1990 | Schulze | 374/161 |
| 4,911,711 A | 3/1990 | Telfair et al. | |
| 4,932,934 A * | 6/1990 | Dougherty et al. | 604/21 |
| 4,946,256 A | 8/1990 | Woodruff | |
| 4,994,059 A * | 2/1991 | Kosa et al. | 606/12 |
| 5,032,005 A | 7/1991 | Woodruff | |
| 5,107,445 A | 4/1992 | Jensen et al. | |
| 5,124,993 A | 6/1992 | Braunlich et al. | |
| 5,153,607 A | 10/1992 | Ichinokawa | |
| 5,211,480 A * | 5/1993 | Thomas et al. | 374/161 |
| 5,222,810 A * | 6/1993 | Kleinerman | 374/161 |
| 5,232,285 A | 8/1993 | Mannik | |
| 5,323,269 A | 6/1994 | Walker et al. | |
| 5,351,268 A * | 9/1994 | Jensen et al. | 374/131 |
| 5,364,391 A | 11/1994 | Konwitz | |
| 5,473,428 A * | 12/1995 | Lee et al. | 374/131 |
| 5,499,313 A | 3/1996 | Kleinerman | |
| 5,579,773 A | 12/1996 | Vo-Dinh et al. | |
| 5,596,590 A | 1/1997 | de Ruyter et al. | |
| 5,684,590 A * | 11/1997 | Sanders et al. | 372/32 |
| 5,754,717 A | 5/1998 | Esch | |
| 5,779,696 A * | 7/1998 | Berry et al. | 606/10 |
| 5,798,518 A | 8/1998 | Coleman et al. | |
| 5,891,394 A | 4/1999 | Drocourt et al. | |
| 5,928,222 A * | 7/1999 | Kleinerman | 606/12 |
| 5,968,036 A * | 10/1999 | Goodman et al. | 606/12 |
| 6,021,151 A | 2/2000 | Eguchi | |
| 6,045,259 A | 4/2000 | Djeu | |
| 6,055,451 A | 4/2000 | Bambot et al. | |
| 6,086,250 A | 7/2000 | Rouhet et al. | |
| 6,095,982 A | 8/2000 | Richards-Kortum et al. | |
| 6,124,597 A | 9/2000 | Shehada et al. | |
| 6,174,291 B1 | 1/2001 | McMahon et al. | |
| 6,231,568 B1 | 5/2001 | Loeb et al. | |
| 6,370,171 B1 * | 4/2002 | Horn et al. | 372/34 |
| 6,475,210 B1 | 11/2002 | Phelps et al. | |
| 6,537,269 B1 | 3/2003 | Abe | |
| 6,567,438 B1 * | 5/2003 | Lin | 372/34 |
| 6,575,962 B1 | 6/2003 | Hohla | |
| 6,775,315 B1 * | 8/2004 | Nield et al. | 606/12 |
| 2002/0136247 A1 | 9/2002 | Ikeda et al. | |

FOREIGN PATENT DOCUMENTS

| | | |
|---|---|---|
| JP | 600 35230 | 2/1985 |
| JP | 9-122963 A | 5/1997 |
| RU | 1267341 A1 | 10/1986 |

OTHER PUBLICATIONS

Smith et al., "Principles And Practice Of Automatic Process Control", 1997, John Wiley & Sons, 2nd edition, pp. 241-243.*

EPO Search Report dated Dec. 16, 2004 for corresponding European Patent Application No. EP 02 25 3974.

EPO Search Report dated Nov. 9, 2004 for corresponding European Patent Application No. EP 02 25 3972.

* cited by examiner

SYSTEM AND METHOD OF MEASURING AND CONTROLLING TEMPERATURE OF OPTICAL FIBER TIP IN A LASER SYSTEM

CROSS REFERENCE TO RELATED APPLICATIONS

This divisional patent application claims priority to and incorporates by reference U.S. patent application Ser. No. 09/906,535 filed Jul. 16, 2001, now U.S. Pat. No. 6,796,710, in the names of David Yates et al., which claims priority to Provisional Application 60/296,783 filed Jun. 8, 2001.

BACKGROUND OF THE INVENTION

The present invention relates to a laser system for transferring energy to tissue during medical treatment procedures and, more particularly, to a system and method of measuring and controlling temperature of an optical fiber tip for the laser treatment system during operation.

It is well known that energy generators in the form of lasers have been utilized to treat many disease states, including cancer, tumors, and benign prostatic hyperplasia (BPH). During the course of such treatments, one parameter which has great importance is the temperature of the tissue being treated. For example, the current recommendation for forming lesions in the prostate as a treatment for BPH is to heat a small volume of tissue to 85° C. for approximately three minutes. It will be appreciated that heating the tissue at a lesser temperature has the effect of incomplete lesion formation, while heating the tissue at a higher temperature can cause excessive tissue damage. Accordingly, the ability to accurately measure the temperature of the optical fiber tip during treatment, as well as control the power output of the laser to maintain the temperature at a desired level, is of primary concern.

It will be understood that there are several known ways of performing the temperature monitoring function for a laser system. One approach has been utilized in a laser treatment system known as the "Indigo 830e Laseroptic Treatment System" manufactured by Ethicon EndoSurgery, Inc. of Cincinnati, Ohio, which is also the assignee of the present invention. This approach involves relying upon the temperature dependence of the fluorescent response of a slug of material at the fiber tip to an optical stimulus. More specifically, a pulse of pump energy causes a fluorescence pulse in an alexandrite slug which is delayed by a time interval corresponding to a temperature of the material. By providing the stimulus signal in the form of a sinusoid, the response signal is likewise a sinusoid and the temperature is related to the phase shift or difference therebetween.

The signals which are compared in the 830e laser treatment system are the actual response or fluorescent signal from the alexandrite and a pair of timing signals (shifted 0° and 90° in phase) which are programmed in its electronics. In this way, digital timing signals are used to strip phase information from the response signal. It has been found, however, that several adjustments and calibrations are required under this approach due to the chain of amplifiers and filters involved. This not only adds complexity and cost to the set-up and maintenance of such systems, but creates an inherent variability between each laser treatment system that must be accommodated during manufacture and service.

Accordingly, it would be desirable for a system and method to be developed in which temperature of an optical fiber tip used with a laser device during treatment is able to be measured and controlled in a manner which minimizes the adjustments and calibrations required, improves the stability and repeatability between laser systems, and reduces complexity and cost.

BRIEF SUMMARY OF THE INVENTION

In accordance with one aspect of the present invention, a method of sensing temperature at an optical fiber tip is disclosed as including the steps of positioning a slug of fluorescent material adjacent the optical fiber tip, providing an optical stimulus having a wavelength within a first predetermined range through at least one fiber optically linked to the optical fiber tip, wherein a desired optical fluorescent response having a wavelength within a second predetermined range from the fluorescent slug is generated, detecting a signal representative of the optical stimulus, detecting a signal representative of the optical fluorescent response, digitally processing the optical stimulus signal and the optical fluorescent response signal to determine a phase difference therebetween, and calculating a temperature for the optical fiber tip as a function of the phase difference. The phase difference between the optical stimulus signal and the optical fluorescent response signal may be determined directly or indirectly as a function of the phase difference between a reference signal and the optical stimulus signal and the phase difference between the reference signal and the optical fluorescent response signal.

In accordance with a second aspect of the present invention, a laser treatment system is disclosed as including a laser for providing a laser beam having a wavelength within a first predetermined range, at least one optical fiber having a first end in communication with the laser beam and a second end through which the laser beam is transmitted, a slug of fluorescent material positioned adjacent the second end of the optical fiber, a light source for providing an optical stimulus having a wavelength within a second predetermined range to the fluorescent slug, wherein a desired optical fluorescent response having a wavelength within a third predetermined range from the fluorescent slug is generated, a detector for detecting the optical fluorescent response, a device for receiving a first signal representative of the optical stimulus and a second signal representative of the optical fluorescent response, and a processor for determining a phase difference between the first and second signals, wherein the temperature of the optical fiber second end is determined as a function of the phase difference.

In accordance with a third aspect of the invention, an optical thermometry system is disclosed as including an optical fiber having a first end for receiving light and a second end for transmitting light, a slug of fluorescent material positioned adjacent the optical fiber second end, a light source for providing an optical stimulus through the optical fiber to the fluorescent slug in order to generate a desired optical fluorescent response therefrom, a detector for detecting the optical fluorescent response, a device for receiving a first signal representative of the optical stimulus and a second signal representative of the optical fluorescent response, and a processor to determine the phase difference between the first and second signals.

In accordance with a fourth aspect of the invention, a method of maintaining temperature of an optical fiber tip in a laser system within a specified range is disclosed as including the steps of positioning a slug of fluorescent material adjacent the optical fiber tip, providing an optical stimulus through at least one fiber optically linked to the optical fiber tip, wherein a desired optical fluorescent response from the fluorescent slug is generated, detecting a signal representative of the optical stimulus, detecting a signal representative of the optical fluorescent response, digitally processing the optical stimulus signal and the optical fluorescent response signal to determine a temperature for the optical fiber tip as a function of a phase difference therebetween, comparing the determined temperature for the optical fiber tip to the specified range, and modifying power output of the laser system as necessary to maintain temperature of the optical fiber tip within the specified range.

In accordance with a fifth aspect of the invention, a method of maintaining temperature of an optical fiber tip in a laser system at a desired temperature is disclosed as including the steps of processing specified light signals to determine a temperature for the optical fiber tip as a function thereof, comparing the determined temperature for the optical fiber tip to the desired temperature, generating an error signal as a function of any difference between the determined temperature and the desired temperature, and controlling power output to a laser diode of the laser system in accordance with the error signal.

In accordance with a sixth aspect of the invention, a system for maintaining temperature of an optical fiber tip in a laser system at a desired temperature is disclosed, wherein the laser system includes a laser diode for providing a laser beam to the optical fiber tip. The system includes a processor for determining a temperature for the optical fiber tip as a function of specified light signals detected in the laser system, a power amplifier for supplying power to the laser-diode, and a controller for providing a power output signal to the power amplifier, where the controller contains an algorithm for calculating the power output signal which is a function of an error signal generated by a comparison of the determined temperature and the desired temperature.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
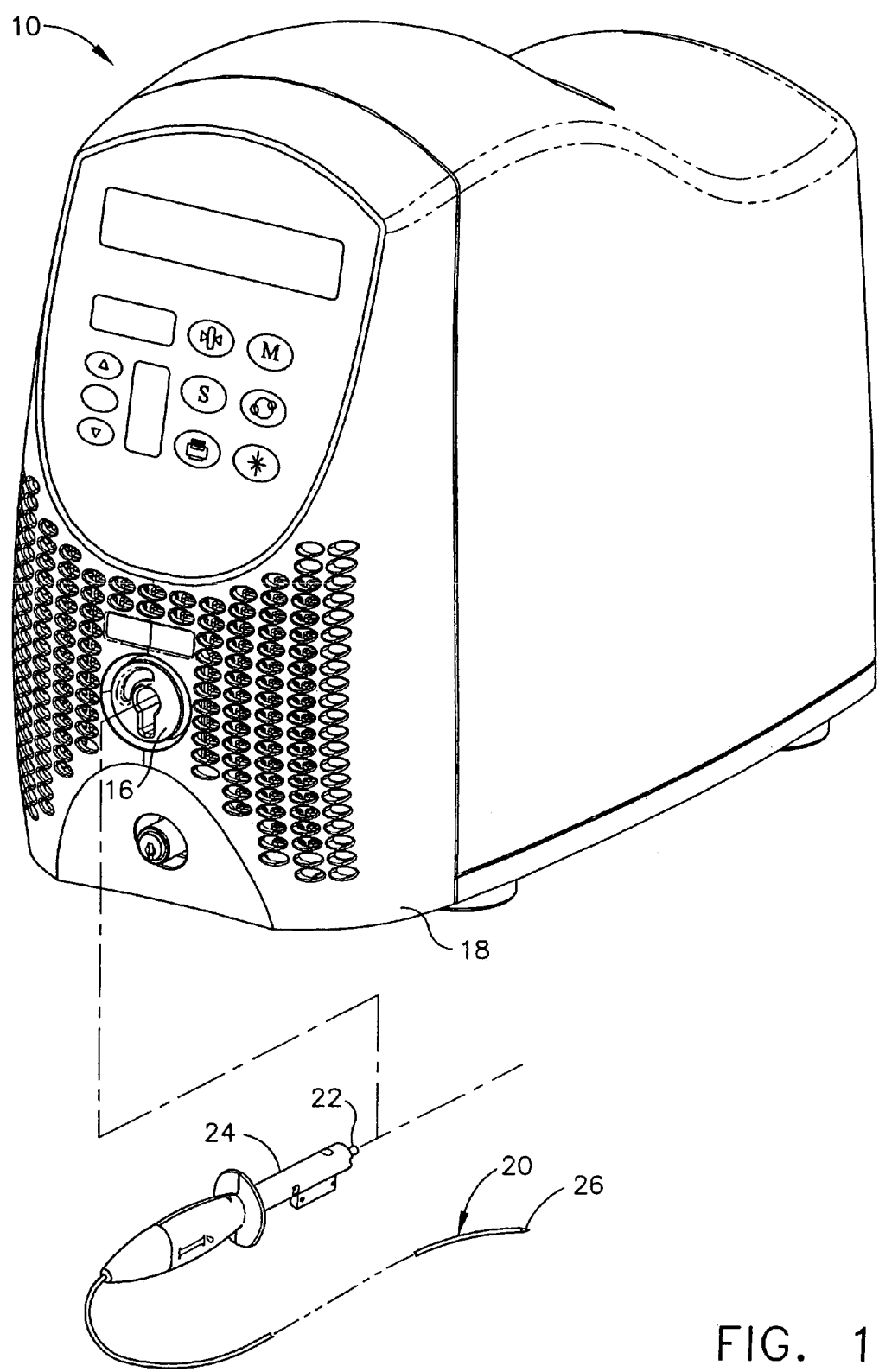
FIG. 1 is an isometric view of the laser treatment system of the present invention.

Referring now to the drawings in detail, wherein identical numerals indicate the same elements throughout the figures, FIG. 1 depicts a laser treatment system 10 for transferring energy to human tissue by means of light from an optical fiber 20. A first laser diode 12 is provided in laser treatment system 10 (see FIG. 9) to produce a first laser beam 14 having a predetermined power (preferably in a range of approximately 2–20 watts) and a predetermined wavelength (preferably in a range of approximately 800–850 nanometers) useful for the medical treatment of disease. As further seen in FIG. 1, a connect block 16 is located within a front portion of a housing 18 for laser treatment system 10. Connect block 16 assists first laser beam 14 in being optically linked with a first end 22 of optical fiber 20 via a connector 24 so that first laser beam 14 can be transmitted from a second end (or tip) 26 of optical fiber 20.

Figure 2:
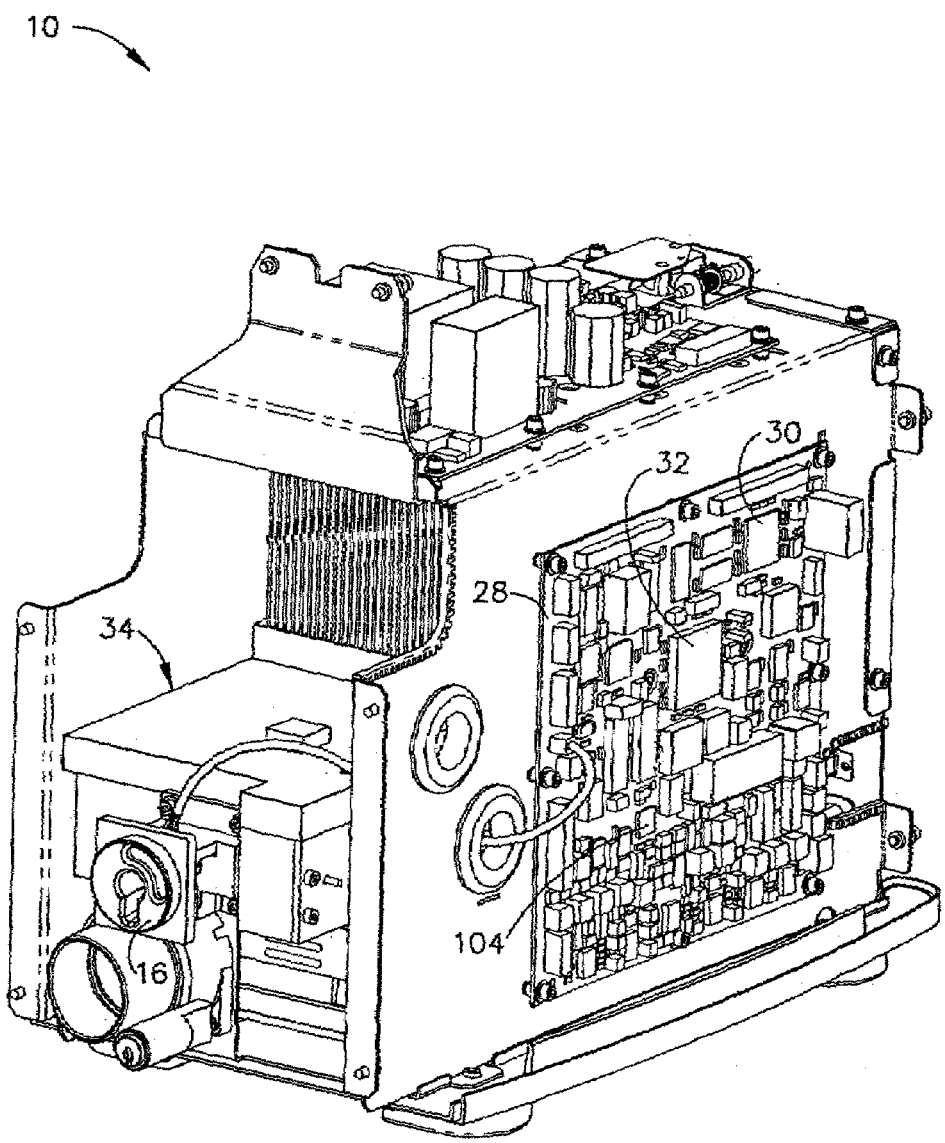
FIG. 2 is an isometric view of the laser treatment system depicted in FIG. 1, where the housing has been removed to enable viewing of a controller board and the exterior of an optical bench therein.

FIG. 2 depicts laser treatment system 10 with housing 18 removed so as to expose a controller board 28. It will be appreciated that, among other components, controller board 28 includes a main processor 30 which receives and processes electronic signals to control the operation of laser treatment system 10. It is preferred that a digital signal processor 32 be provided on controller board 28 solely to calculate the phase difference between signals (as explained in greater detail hereinbelow). Accordingly, digital signal processor 32 is serially interfaced with main processor 30, which also functions to process signals relating to such phase difference in order to determine the temperature of optical fiber tip 26. It will be appreciated, then, that main processor 30 and digital signal processor 32 work in concert while in the appropriate laser operating mode to assure that the necessary power is provided to laser diode 12 so that optical fiber tip 26 is maintained at the desired temperature during treatment. Laser treatment system 10 also includes an optical bench, identified generally by reference numeral 34, in order to direct first laser beam 14 into optical communication with optical fiber first end 22 during operation.

Figure 3:
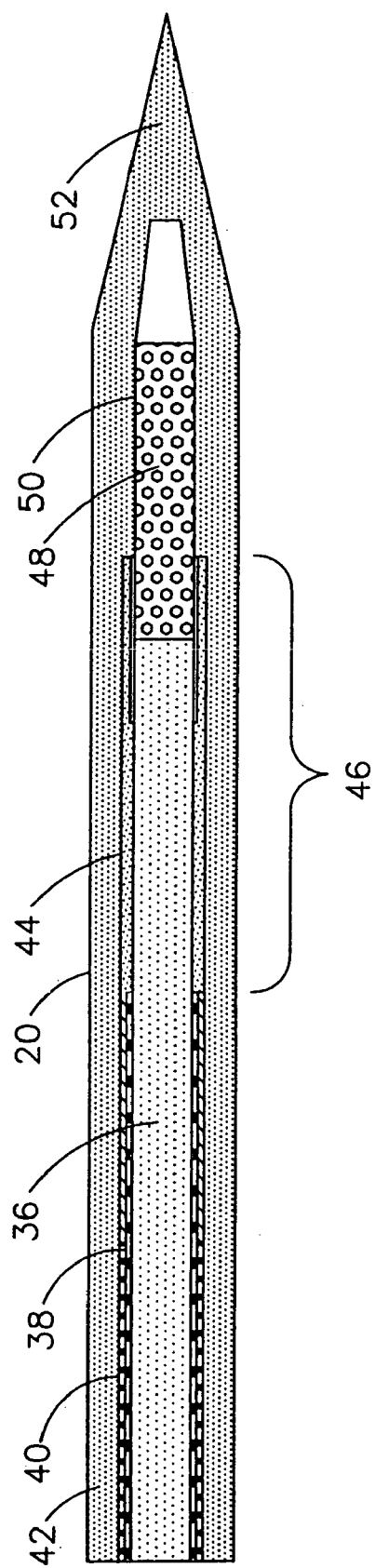
FIG. 3 is an enlarged, partial section view of an optical fiber utilized with the laser treatment system shown generally in FIG. 1.

FIG. 3 depicts a partial section view of optical fiber 20, which preferably is constructed in accordance with a patent application entitled "Optical Fiber Including A Diffuser Portion And Continuous Sleeve For The Transmission Of Light," Ser. No. 09/785,571, owned by the assignee of the present invention and hereby incorporated by reference. As seen in FIG. 3, a central silica core 36 is preferably provided and includes a circumferential fluoropolymer cladding 38 and an outer buffer layer 40 (e.g., Tefzel) therearound. It will be understood that cladding 38 and outer buffer layer 40 each provide mechanical support to core 36 and have a lower index of refraction than core 36. In this way, cladding 38 and outer buffer layer are able to block light from emerging out of core 36. Optical fiber 20 further includes a sleeve 42, preferably made of perflouroalkoxy (PFA) compounded with barium sulfate particles, which is optically and mechanically coupled to core 36 by a layer 44 of UV curable optical adhesive. This is best seen in a diffuser portion 46 of optical fiber 20, where cladding 38 and outer buffer layer 40 have been removed so that light from first laser beam 14 transmitted through core 36 may be conducted from adhesive layer 44 through sleeve 42 and scattered into tissue during a medical treatment.

It will further be seen that a slug 48 of fluorescent material is positioned within an annulus 50 adjacent a downstream end of diffuser portion 46 so that any light from first laser beam 14 not exiting diffuser portion 46 exits through the end of core 36 and is scattered and reflected back into core 36. Fluorescent slug 48 also functions as an optical temperature sensor and preferably is within a class of materials consisting of chromium-doped garnets (e.g., alexandrite, ruby, and emerald), semiconductor-doped glasses (e.g., Schott RG 665 filter glass manufactured and sold by Schott Glass Co. of Yonkers, N.Y.), phosphors, or other temperature dependent fluorescent materials. In this way, fluorescent slug 48 is able to receive an optical stimulus from a light source having a first wavelength and generate an optical fluorescent response at a second wavelength, where the wavelength of the optical stimulus and the optical fluorescent response are different from that of first laser beam 14. In this regard, it is preferred that fluorescent slug 48 be substantially transparent to the wavelength of first laser beam 14 from laser diode 12 so as not to affect its use in treating tissue. A penetrating tip 52 is then attached to annulus 50 in order to assist in medical treatments.

Figure 4:
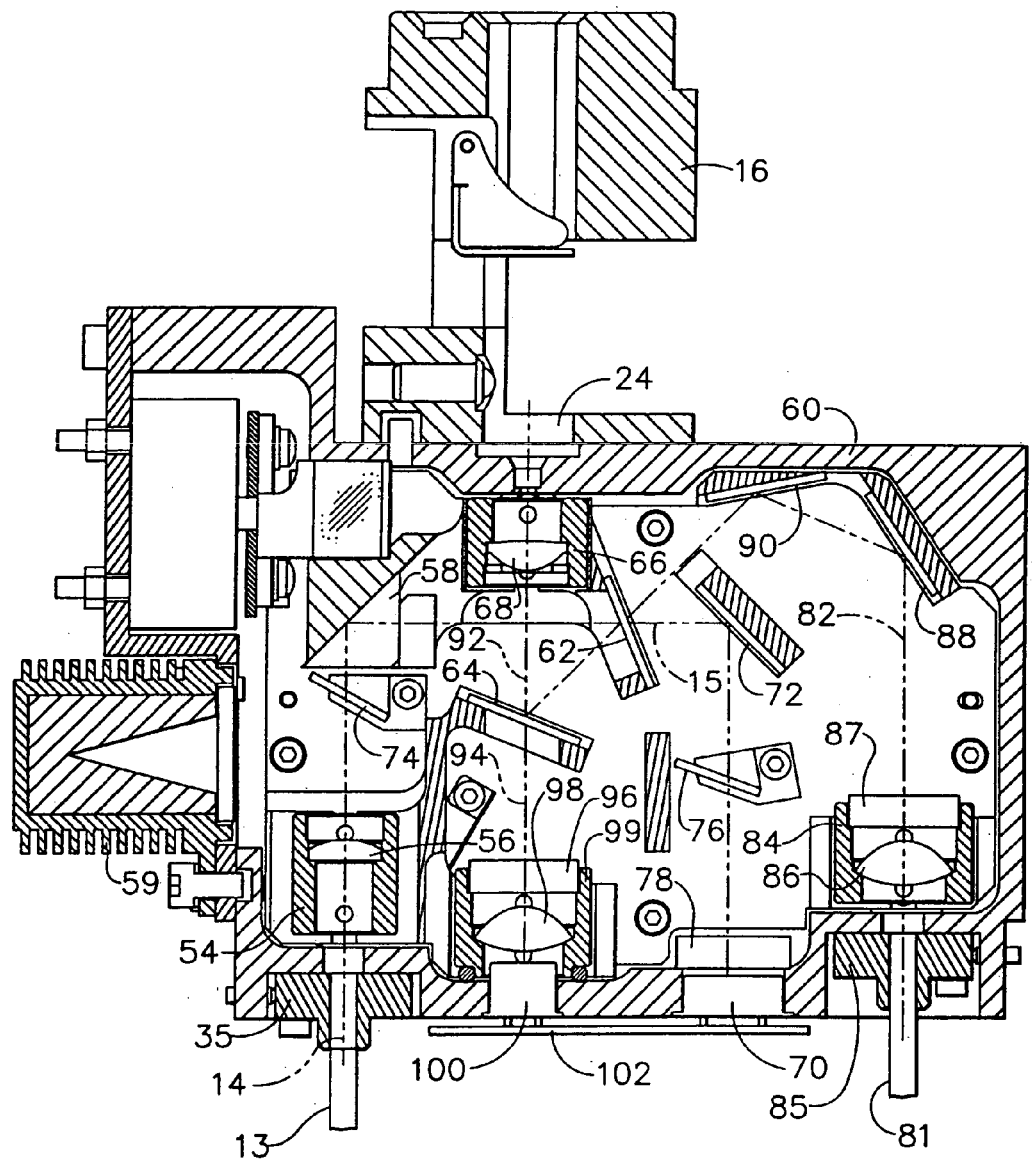
FIG. 4 is a section view of the optical bench depicted in FIG. 2, where the steering optics therein are positioned so as to allow a pair of laser beams to pass through the optical bench and into the optical fiber.
Figure 5:
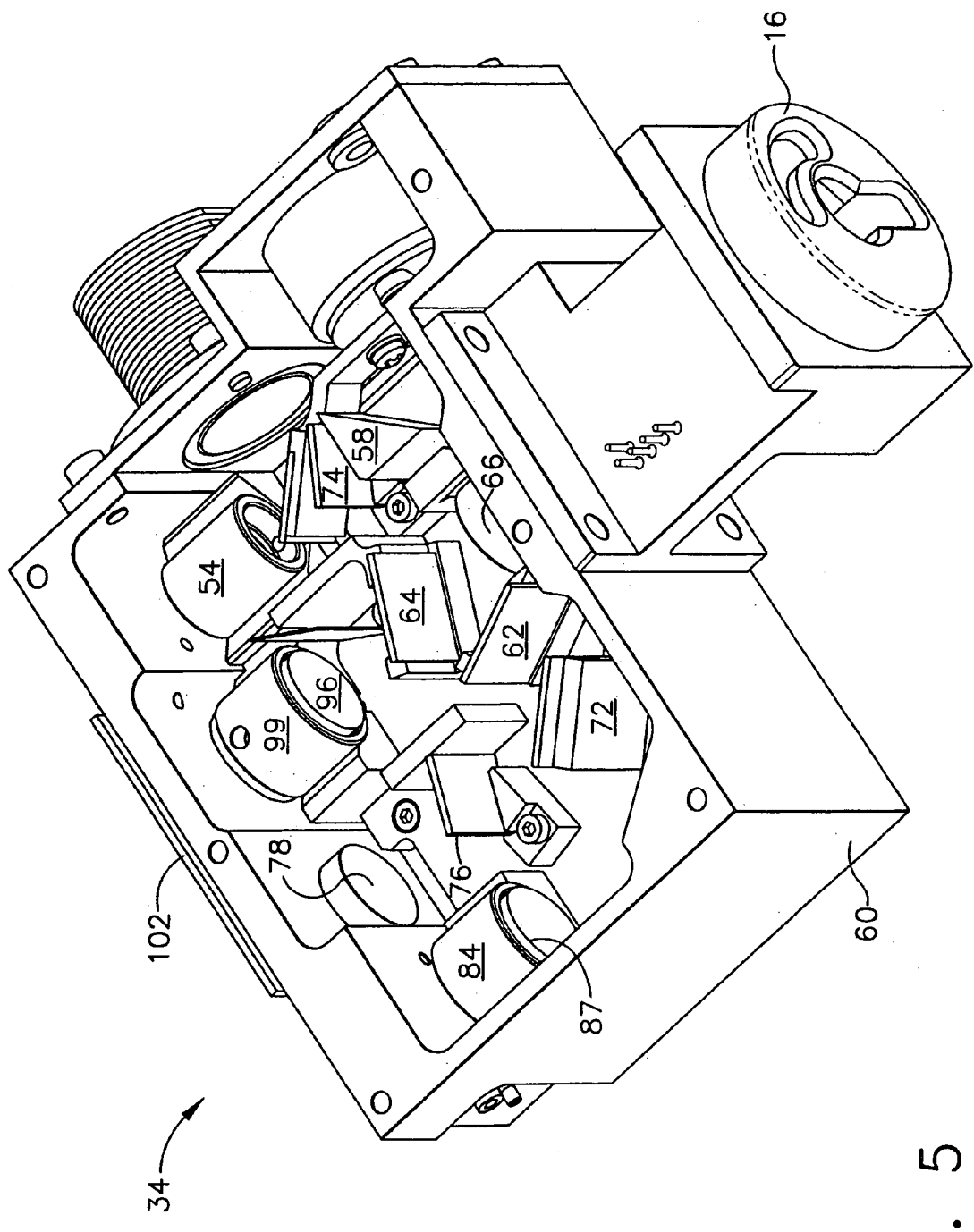
FIG. 5 is an isometric view of the optical bench depicted in FIGS. 2 and 4, where a connect block and a sensor board are shown as interfacing therewith.

Turning to optical bench 34, it will be seen from FIGS. 4 and 5 that the path of first laser beam 14 enters optical bench 34 from an optical fiber 13 in optical communication with first laser diode 12. Optical fiber 13 is positioned within a connector 35 in optical bench 34 to assure proper alignment. First laser beam 14 is transmitted through a beam collimator 54 containing a lens 56 and is preferably directed toward a total internal reflection (TIR) prism 58 mounted to a housing 60 for optical bench 34. First laser beam 14 preferably reflects off TIR prism 58 and is received by a first beamsplitter 62, which reflects first laser beam 14 toward a second beamsplitter 64. First laser beam 14 is then reflected from second beamsplitter 64 through an output beam lens assembly 66 and an output lens 68 therein so as to place first laser beam 14 in optical communication with optical fiber first end 22 via connector 24. It will be appreciated that a small percentage of first laser beam 14 (identified by reference numeral 15) is preferably transmitted by first beamsplitter 62 to a laser power detector 70 by means of a turning mirror 72 so that the power output of first laser beam 14 can be monitored. Further explanation of first beamsplitter 62, laser power detector 70, and laser beam 15 is provided in a related patent application filed concurrently herewith entitled "Apparatus And Method Of Monitoring And Controlling Power Output Of A Laser System," having Ser. No. 09/877,275 which is owned by the assignee of the present invention and hereby incorporated by reference. Of course, various filters may be employed to better isolate and attenuate the wavelength of light provided by first laser beam 14, as exemplified by filter 74, correction filter 76, and neutral density filter 78.

Similarly, a second laser diode 80 (see FIG. 9) preferably provides a second laser beam 82, also known herein as a marker laser beam, to optical bench 34 by means of an optical fiber 81. Optical fiber 81 is positioned within a connector 85 in optical bench 34 to assure proper alignment. Second laser beam 82 is transmitted through a marker beam collimator 84, a marker lens 86, and a marker filter 87 attached to optical bench housing 60. Marker laser beam 82 preferably has a predetermined power (preferably in a range of approximately 0.5–2 milliwatts) and a predetermined wavelength (preferably in a range of approximately 600–650 nanometers). It will be appreciated that marker laser beam 82, which is preferably time modulated as a sinusoidal signal, is used as the light source to optically stimulate fluorescent slug 48 in optical fiber 20 so as to generate a desired optical fluorescent response therefrom. In order to place marker laser beam 82 in optical communication with optical fiber first end 22 via connector 24, it is directed toward a first laser turning mirror 88 which reflects it to a second laser turning mirror 90. Marker laser beam 82 then impacts first beamsplitter 62, which transmits most of marker laser beam 82 (as a function of its wavelength) so that it passes therethrough to second beamsplitter 64. Marker laser beam 82 then reflects off second beamsplitter 64 and through output beam lens assembly 66 and output lens 68. Accordingly, both first (treatment) laser beam 14 and second (marker) laser beam 82 are routed from first beamsplitter 62 to second beamsplitter 64, as indicated by reference numeral 92, into first end 22 of optical fiber 20 during normal operation of laser treatment system 10.

It will be appreciated that marker laser beam 82 provides an optical stimulus to fluorescent slug 48, which absorbs the energy of marker laser beam 82 and fluoresces in response thereto. The time delay from stimulation of fluorescent slug 48 by marker laser beam 82 to the fluorescence of fluorescent slug 48 is a function of the temperature of optical fiber second end 26 and can be measured and used to calculate such temperature. The optical fluorescent response, indicated by reference numeral 94, is transmitted back through optical fiber 20 and out optical fiber first end 22 into optical bench 34. Optical fluorescent response 94 preferably has extremely low power (in a range of approximately 5–100 nanowatts) and has a preferred wavelength of approximately 680–780 nanometers. Optical fluorescent response 94 then passes through output lens 68 and output beam lens assembly 66 to second beamsplitter 64. Second beamsplitter 64 is constructed so that optical fluorescent response 94 is transmitted therethrough to a signal filter set 96, which functions to block most of any reflected marker and treatment light. The remaining signal, filtered to pass only the fluorescent and blackbody wavelengths, passes through a focussing lens 98 held together with signal filter set 96 in a signal optical assembly 99 and onto a fluorescence/blackbody detector 100.

It will be seen that a sensor board 102 is provided adjacent to optical bench housing 60 so as to interface with fluorescence/blackbody detector 100 and laser power detector 70. In particular, it will be appreciated that circuitry on sensor board 102 amplifies and conditions the outputs from detectors 70 and 100. Sensor board 102 is also connected to and communicates with controller board 28 in order to calculate the temperature of optical fiber second end 26, sense blackbody signals and measure the optical output power of first laser beam 14.

Figure 6:
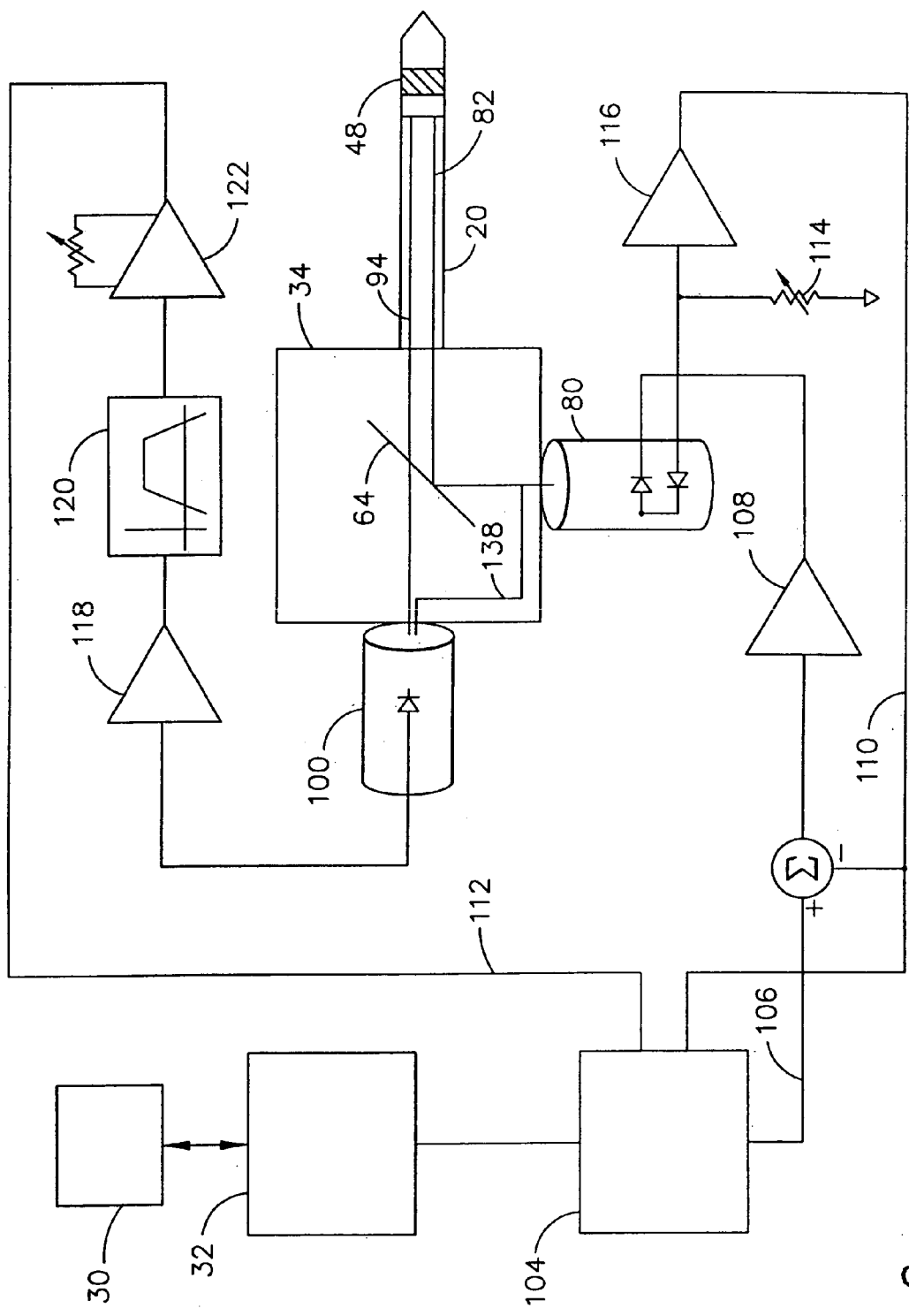
FIG. 6 is a circuit diagram of an optical thermometry system utilized by the laser treatment system depicted in FIG. 1 in accordance with the present invention.

In order to sense and maintain the temperature of optical fiber second end 22, an optical thermometry system in accordance with the present invention is provided as part of laser treatment system 10. More specifically, FIG. 6 depicts a device 104, such as a coder/decoder (CODEC), located on controller board 28 as being utilized to provide a sinusoidal reference signal 106 (see FIG. 7) to a marker drive 108 for second laserdiode 80 so that the optical stimulus provided by marker laser beam 82 and the optical fluorescent response 94 from fluorescent slug 48 are sinusoids having substantially the same frequency. Of course, device 104 includes the necessary digital-to-analog converter to provide marker drive 108 the appropriate signal.

It will be appreciated that device 104 also receives analog signals 110 and 112 which are representative of the optical stimulus from marker laser beam 82 and optical fluorescent response 94 from detector 100. Device 104 also includes analog-to-digital converters therein for transforming signals 110 and 112. Circuitry is provided on controller board 28 for controlling the power of second laser diode 80 and thus keep signal 110 substantially constant. More specifically, a potentiometer 114 and an amplifier 116 function to set the optical power of marker laser beam 82 and control the level for signal 110 within a specified range. Similarly, signal 94 is amplified and filtered by an amplifier 118 and a filter 120, respectively, located on sensor board 102 to facilitate processing of signal 112 by digital signal processor 32. A second amplifier 122 is also preferably located on controller board 28 and serves to further amplify the filtered signal prior to receipt by device 104.

It will be appreciated that elements other than fluorescent slug 48 (i.e., amplifier 118, filter 120, and amplifier 122) may influence optical fluorescent signal 112 and its phase shift 128 with respect to optical stimulus signal 110. Phase shift 128 is depicted in the figures as the change in time between two sinusoids of the same frequency. Accordingly, a calibration scheme has been developed to calculate the effects on optical fluorescent signal 112. In particular, it will be seen in FIG. 8 that a port 130 is provided in a top portion 132 of optical bench housing 60. This permits an optical fiber to be inserted therein which is in optical communication with marker laser beam 82 via connector 24. In this way, marker laser beam 82 is directed on detector 100 without passing through signal filter set 96 so that the inherent phase shift of the aforementioned elements can be measured and subtracted from optical fluorescent signal 112 (see calibrating signal 111 and the inherent phase shift with optical stimulus signal 110 denoted by reference numeral 125 in FIG. 7). This is also depicted schematically in FIG. 6 by feedback loop 138 where optical stimulus signal 110 bypasses fluorescent slug 48 and is provided directly to detector 100. In this way, operation of all laser treatment systems 10 can be normalized regardless of variability between components.

An alternative calibration scheme would be to provide an optical fiber plug-in including a fluorescent part therewith (not shown), where the fluorescent part has a very quick fluorescence at substantially the same wavelength as optical fluorescent signal 112 and can be inserted into connector 24 instead of optical fiber 20. It will be appreciated that an exemplary fluorescent is available through Labsphere, Inc. of North Sutton, N.H. Accordingly, marker laser beam 82 is provided to the fluorescent and an optical fluorescent response signal is emitted therefrom to detector 100 as described above with respect to fluorescent slug 48. This signal is then quantified and utilized to subtract out any inherent phase shift in optical fluorescent response signal 112 received by device 104.

The phase difference processing of signals 110 and 112 is preferably performed by digital signal processor 32, which then sends the appropriate signals to main processor 30 for calculation of the temperature for optical fiber second end 26 as a function of such phase (i.e., by means of a polynomial algorithm of at least the third order and preferably of the fifth order). Of course, such signals 110 and 112 will take into account the calibration of laser treatment system 10 and inherent phase shift 125 described hereinabove. While the phase difference between signals 110 and 112 may be determined directly, it has been found preferable to utilize reference signal 106 provided by device 104 to drive 108.

Figure 7:
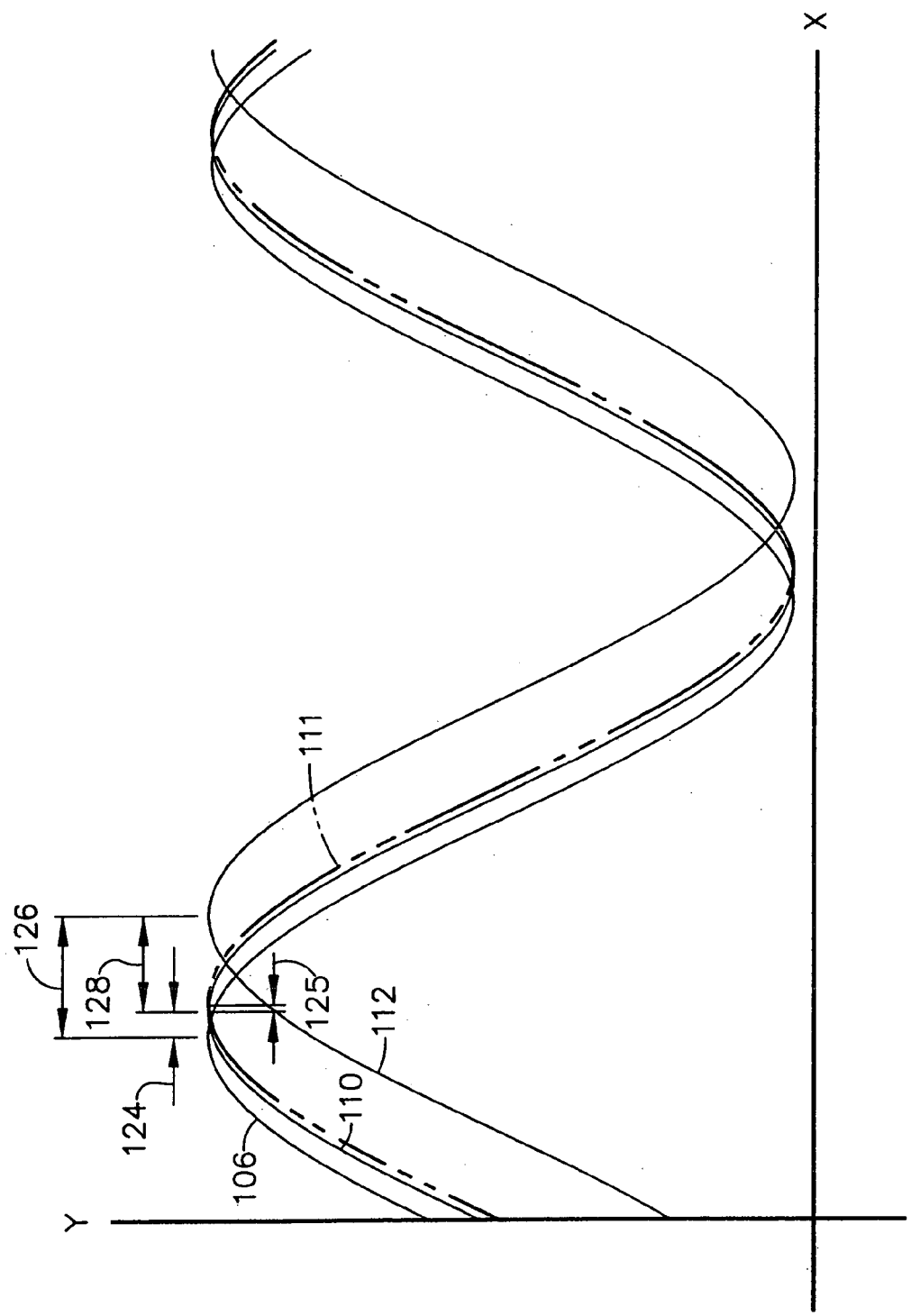
FIG. 7 is a timing diagram of the reference, stimulus, response and calibrating signals depicted in FIG. 6.
Figure 8:
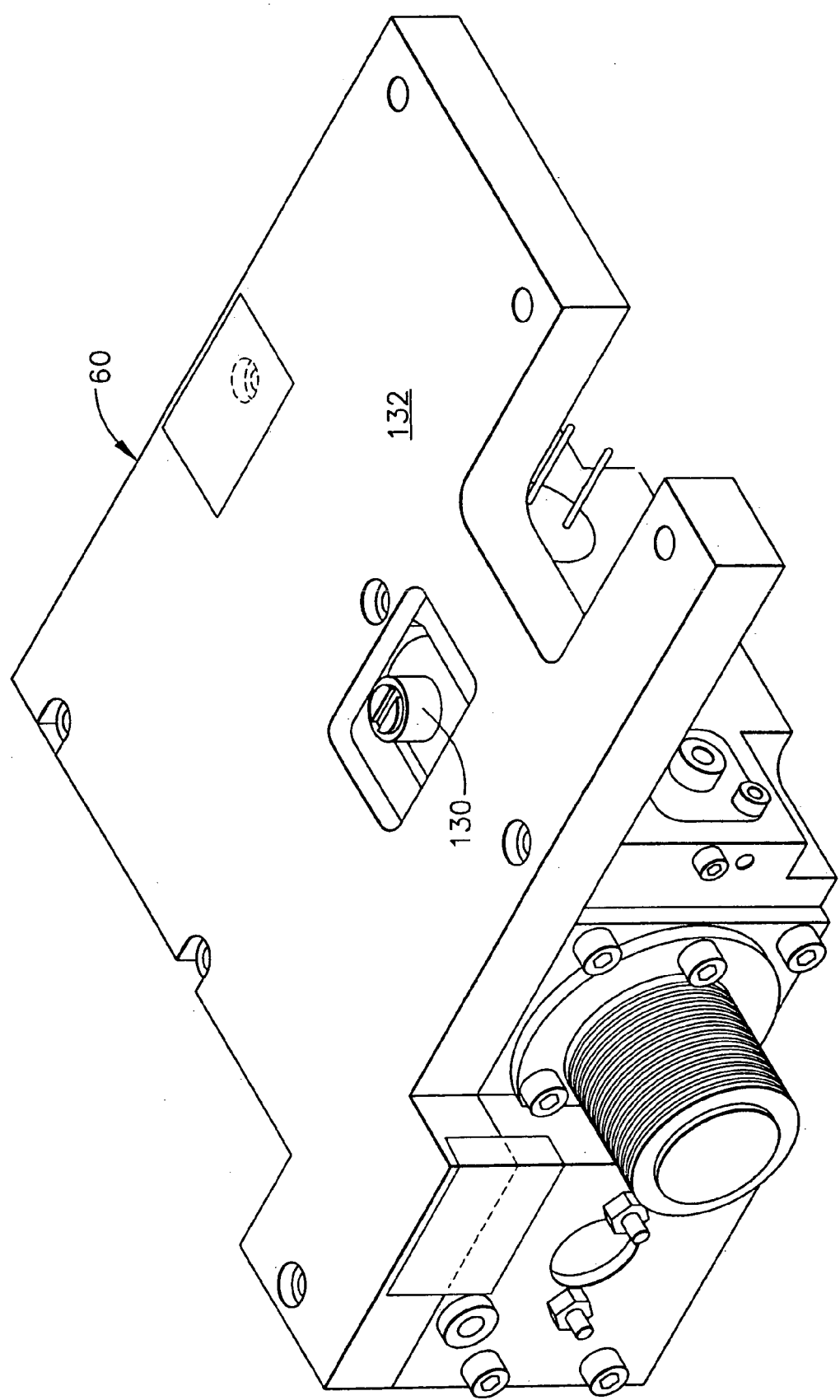
FIG. 8 is a top view of the optical bench depicted in FIGS. 2, 4 and 5.

Accordingly, as seen in FIG. 7, a first phase difference 124 between reference signal 106 and optical stimulus signal 110 and a second phase difference 126 between reference signal 106 and optical fluoroluminescent signal 112 is determined, with the difference between first and second phase differences 124 and 126 being equivalent to an overall phase difference 128 between optical stimulus signal 110 and optical fluorescent signal 112.

Figure 9:
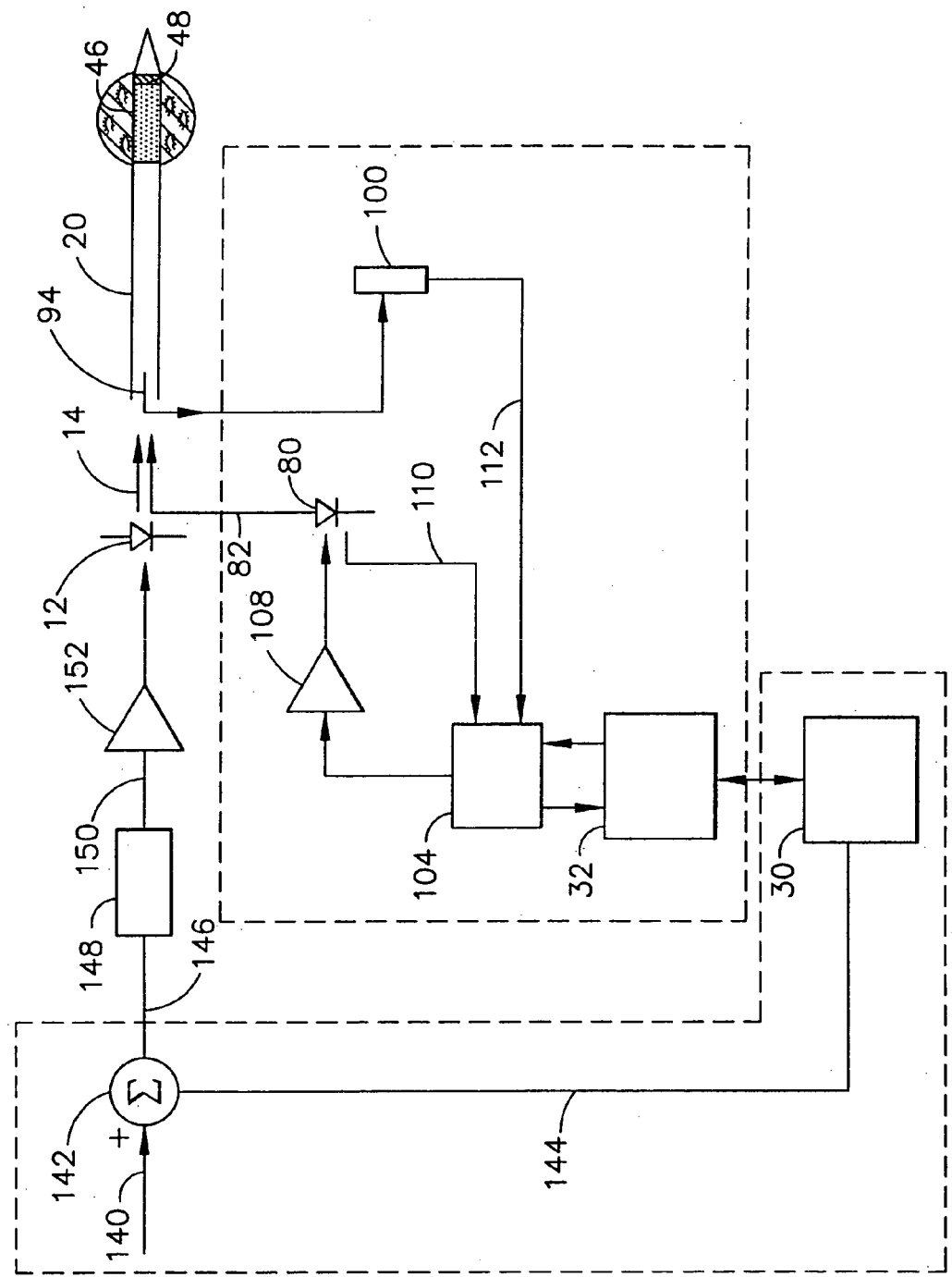
FIG. 9 is a schematic block diagram of circuitry in the laser treatment system utilized to maintain a desired temperature of the optical fiber tip in accordance with the present invention; and, FIG. 10 is a schematic block diagram of a controller utilized with the main processor shown in FIG. 9 to maintain the optical fiber within a desired temperature range.

Besides merely calculating the temperature of optical fiber second end 26, however, laser treatment system 10 also functions to utilize such information in order to maintain a desired temperature there and in the adjacent tissue. This is accomplished by monitoring such temperature and providing the necessary power adjustments to first laser beam 14 as necessary. As seen in FIG. 9, a temperature set point 140 indicative of the desired temperature is provided to a summing device 142. A feedback signal 144 from main processor 30 is also provided to summing device 142 indicating the current sensed temperature of optical fiber second end 26, whereby Error signal 146 does change sign and will be considered positive when sensed temperature 144 is less than desired temperature 140 and negative when sensed temperature 144 is greater than desired temperature 140. It will be seen that error signal 146 is provided to a controller 148, which, in turn, provides a signal 150 to a power amplifier 152 that adjusts the power to laser diode 12. In the preferred embodiment, control of power for first laser beam 14 based on temperature set point 140 and feedback signal 146 is accomplished via software in main processor 30.

Figure 10:
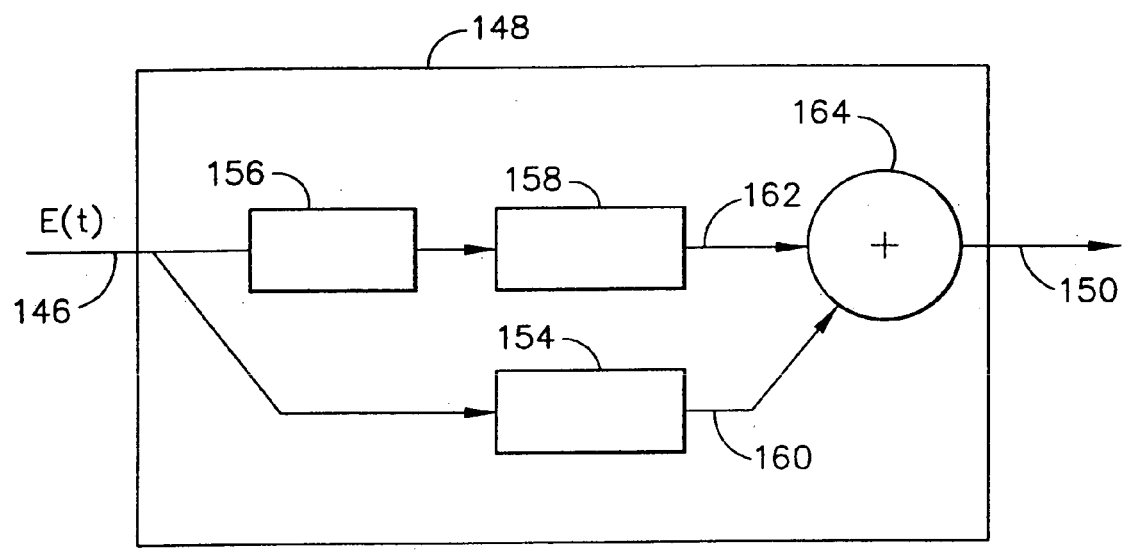

More specifically, it will be seen from FIG. 10 that controller 148 preferably utilizes a proportional integral (PI) control algorithm which includes a proportional component and an integrator component. The proportional component is made up of error signal 146 being multiplied by a scaling factor $K_p$ indicated by box 154 and the integrator component involves error signal 146 (also shown mathematically as E(t)) being provided to an integrator 156 and multiplied by a scaling factor $K_i$ as shown in box 158. It will be understood by those of ordinary skill in the art that scaling factors $K_p$ and $K_i$ are constants which are selected to provide a balance between response time, overshoot and accuracy of the final value of temperature, the dynamics of the tissue involved, and have units of watts/° C. Output signals 160 and 162 from the proportional component and integrator component, respectively, are then added in a summing device 164 to provide power signal 150. Thus, power signal 150 can be represented mathematically by the following:

$$P(t) = K_p \times E(t) + K_i \int E(t)dt.$$

It will be appreciated that the integrator component, which sums all error from past performance of the control algorithm, is preferably utilized only when the sensed temperature 144 calculated by main processor 30 is within a defined control band (e.g., desired temperature 140 plus or minus 5° C.). Accordingly, if sensed temperature 144 is lower than the control band (i.e., less than desired temperature 140 minus 5° C.), then signal 150 from controller 148 provides for power amplifier 152 to supply maximum power (e.g., 15 Watts) to laser diode 12 so as to warm the tissue being treated. By contrast, if sensed temperature 144 is higher than the control band (i.e., more than desired temperature 140 plus 5° C.), then signal 150 from controller 148 provides for power amplifier 152 to supply minimum power (e.g., 0 Watts) to laser diode 12. In this way, the tissue being treated is able to cool and return to a temperature within the control band. It has been learned that laser diode 12 may not reliably produce coherent laser output below approximately 2 Watts, so power to laser diode 12 can be momentarily turned off in the preferred embodiment to provide a power of less than 2 Watts. It will be noted, then, that the integrator component of the control algorithm has a greater effect as sensed temperature 144 gets closer to desired temperature 140 and is what gives the control algorithm the ability to drive error signal 146 to zero.

In order to prevent integrator wind-up and otherwise optimize system performance, it is preferred that the integrator component of controller 148 be preloaded or precharged upon recognition of a transition point at either end of the control band so that power signal 150 remains continuous for one iteration of the control algorithm. This can be backsolved from the aforementioned mathematical equation to be:

$$\int E(t)dt = P(t) - K_p/K_i \times E(t).$$

In this way, power oscillations are avoided during the transition into the lower end of the control band, for example, so that a smooth reduction in power signal 150 occurs accompanied by a sensed temperature 144 which slightly overshoots desired temperature 140 (but stays within the control band) and then is maintained at such desired temperature 140. Thus, not only does operation of laser treatment system 10 become smoother, but the time to reach steady state at desired temperature 140 is reduced.

Having shown and described the preferred embodiment of the present invention, further adaptations of the system and method for measuring and controlling temperature of an optical fiber tip during treatment by the laser treatment system can be accomplished by appropriate modifications by one of ordinary skill in the art without departing from the scope of the invention.

What is claimed is:

1. A method of maintaining temperature of an optical fiber tip in a laser system at a desired temperature, comprising the following steps:
   (a) processing an optical stimulus and an optical response to determine a temperature for said optical fiber tip as a function thereof;
   (b) comparing said determined temperature for said optical fiber tip to said desired temperature;
   (c) generating an error signal as a function of any difference between said determined temperature and said desired temperature; and
   (d) controlling power output to a laserdiode of said laser system in accordance with said error signal;
wherein the method further comprises the step of determining whether said determined temperature is within a defined control band having an upper and lower limit; and wherein a maximum power output is provided to said laserdiode when said determined temperature is less than said lower limit.

2. The method of claim 1, wherein a minimum power output is provided to said laserdiode when said determined temperature is greater than said upper limit for said control band.

3. The method of claim 1, wherein said power output to said laserdiode is a function of a proportional component and an integrator component when said determined temperature is within said control band.

4. The method of claim 3, said proportional component of said power output being the product of said error signal and a proportional scaling factor.

5. The method of claim 3, said integrator component of said power output being the product of an integrator scaling factor and each said error signal integrated over time.

6. The method of claim 5, wherein said integrator component is only utilized upon said determined temperature transitioning into said control band so that said power output to said laserdiode remains continuous during said transition.

7. A system for maintaining temperature of an optical fiber tip in a laser system at a desired temperature, said laser system including a laser diode for providing a laser beam to said optical fiber tip, comprising:
   (a) a processor for determining a temperature by processing an optical stimulus and an optical response;
   (b) a power amplifier for supplying power to said laser diode; and
   (c) a controller for providing a power output signal to said power amplifier, said controller containing an algorithm for calculating said power output signal which is a function of an error signal generated by a comparison of said determined temperature and said desired temperature; wherein said controller provides a power output signal so that a maximum power is supplied to said laser diode by said power amplifier when said determined temperature is less than a lower limit of a defined control band for said desired temperature.

8. The system of claim 7, wherein said controller provides a power output signal so that a minimum power is supplied to said laser diode by said power amplifier when said determined temperature is greater than an upper limit of a defined control band for said desired temperature.

9. The system of claim 7, wherein said algorithm is a function of a proportional component and an integrator component when said determined temperature is within a defined control band for said desired temperature.

10. The system of claim 9, said proportional component of said algorithm being a product of said error signal and a proportional scaling factor.

11. The system of claim 9, said integrator component of said algorithm being a product of an integrator scaling factor and each said error signal integrated over time.

12. The system of claim 11, wherein said integrator component is only utilized upon said determined temperature transitioning into said control band so that power supplied to said laser diode remains continuous during said transition.

* * * * *